Nov. 17, 1936.  W. J. ETTINGER  2,061,418
TEMPERATURE CONTROL DEVICE
Filed May 22, 1934
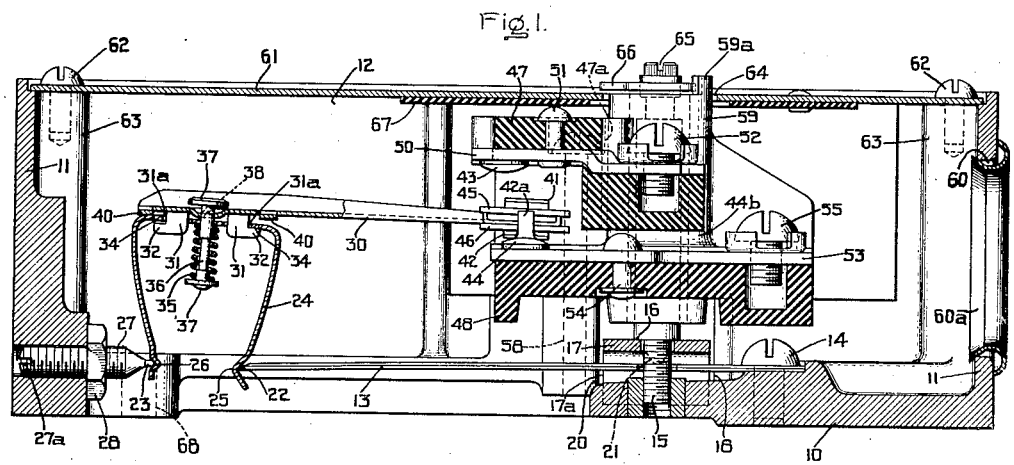
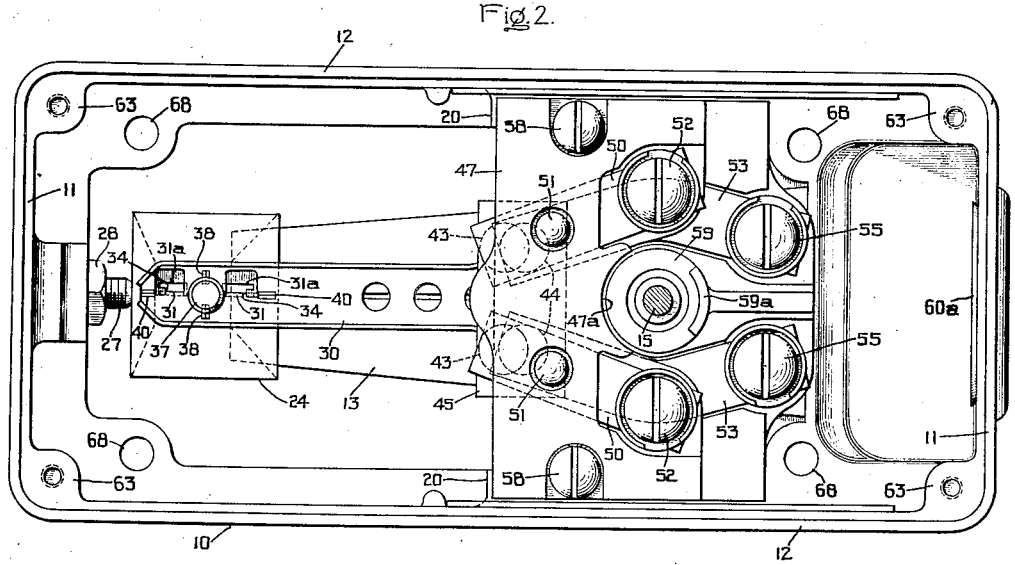
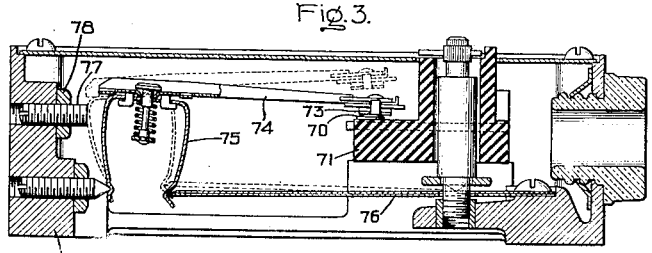
Inventor:
Wallace J. Ettinger,
by Harry E. Dunham
His Attorney.

Patented Nov. 17, 1936

2,061,418

UNITED STATES PATENT OFFICE 2,061,418

TEMPERATURE CONTROL DEVICE

Wallace J. Ettinger, Chicago, Ill., assignor to Edison General Electric Appliance Company, Chicago, Ill., a corporation of New York Application May 22, 1934, Serial No. 726,891

4 Claims. (Cl. 200—139)

This invention relates to temperature control devices, more particularly to devices for controlling an electric circuit in accordance with temperature changes, and it has for its object the provision of an improved device of this character.

In general this invention relates to temperature responsive devices such as described and claimed in the United States reissue patent to A. Lewerenz No. 16,654, dated June 14, 1927, and in the United States patent to A. H. Simmons No. 1,743,073, dated January 7, 1930 and more specifically relates to improvements in one form of the temperature control device described and claimed in the copending application of Francis H. McCormick, Serial No. 575,593, filed November 17, 1931, and assigned to the same assignee as this invention, and which is an improvement of certain features of the Simmons patent. These temperature control devices comprise a bimetallic thermostat bar fixed at one end and having its other end free to move in response to changes in temperature. These movements of the bimetallic bar are utilized to operate a suitable control member, such as a switch arm. Bearing on the movable end of the bimetallic bar is an elastic member arranged to cause the bar to move quickly from one position to another and thereby give the switch a snap action in opening and closing the circuit which it controls. This invention is particularly applicable to a thermostatic device such as shown in the McCormick application wherein two separate sets of switch contacts are controlled by the switch arm, and contemplates the provision of improved operable connection means between the control arm and the bimetallic thermostat bar, whereby a rugged, reliable and efficient device is obtained.

In accordance with this invention, the elastic member which bears on the movable end of the bimetallic thermostat bar has a substantially U-shape. A comparatively rigid and mechanically strong switch arm is mounted longitudinally on the base of the U-shaped spring member and has a loose connection with this member so that it can rotate on the base on axes arranged both transversely and longitudinally of the base.

The loose connection means between the arm and the spring provides for limited freedom of movement of these members relative to each other. Preferably, suitable elastic means will be provided for biasing the control arm toward the base of the spring so that when the arm is in either of its controlling positions to close the corresponding switch contacts, the arm will be urged against the contacts by an elastic force. By reason of this elastic force applying means and the loose connection between the arm and the U-shaped spring, the bimetallic bar when moving between its controlling positions acquires considerable velocity before the contact arm is actuated to open the one set of switch contacts and to close the other.

For a more complete understanding of this invention, reference should be had to the accompanying drawing in which Fig. 1 is a vertical central sectional view of a temperature control device embodying this invention; Fig. 2 is a plan view of the temperature control device of Fig. 1 but having a certain member removed so as to illustrate certain details of construction; and Fig. 3 is a vertical central sectional view of a temperature control device illustrating a modification of my invention.

Referring more particularly to Figs. 1 and 2, this invention has been shown in one form as applied to a temperature responsive device intended to be used to control rather large currents, such as those encountered in domestic hot water heating systems, but it is to be understood that it is applicable to thermostats that are used in systems where the currents are relatively small and also in systems wherein the currents handled are considerably larger than those encountered in domestic hot water systems. As shown, the temperature control device comprises a base or supporting member 10 formed from a suitable metallic material, such as aluminum. The base 10 is provided with integral end and side walls 11 and 12 respectively rising vertically therefrom so as to define a substantially rectangular casing.

A suitable temperature responsive member 13, shown as a bimetallic thermostat blade or bar is mounted upon the support 10. This blade is made of two strips of metal having dissimilar temperature coefficients of expansion, such as brass and invar, the strips being securely brazed or welded together likewise. The bar 13 is rigidly secured at one end to the support 10 by means of clamping screws 14 passed through apertures provided for them in the bar and received in threaded apertures provided for them in the base 10. It will be observed that the other end of the bimetallic bar is free to move laterally in response to changes in temperature.

An adjusting screw 15 is provided near the fixed end of the bar 13. This screw is passed through a suitable aperture provided for it in the bar and at its lower end is threaded in the support 10, as clearly shown in Fig. 1. The adjusting screw 15, as shown, has a shoulder 16 that bears against a suitable thrust plate 17 which extends transversely of the casing above the bimetallic bar 13. The thrust plate 17 extends substantially the full width of the base 10 and has its opposite end portions turned downwardly at right angles to the body portion to form depending portions 17a which are retained against lateral movement by means of abutments 18 on their right-hand side, as viewed in Fig. 1, and by means of bosses 20 on their other side. The plate 17 is provided on its lower surface with bearings 21 arranged on opposite sides of the adjusting screw 15 and resting on the upper surface of the bimetallic bar 13. Only one of these bearings 21 has been shown.

It will be understood that the bimetallic bar 13, by reason of its elasticity and the initial curvature given the blade, forces the thrust plate 17 upwardly against the abutment 16 provided on the adjusting screw 15, and that the thrust plate may be moved downwardly by means of the adjusting screw against the elastic force of the bimetallic bar to change its position relative to the base 10.

The movable end of the bimetallic bar is provided with a knife edge bearing 22. Between this bearing and a bearing 23 secured in the adjacent end wall 11 of the casing is interposed an inverted substantially U-shaped resilient member or spring 24. As shown, one arm of this spring has a bearing seat 25 which receives the knife edge bearing 22 on the bar 13, while its other arm has a bearing seat 26 which receives the bearing 23. The bearing seat 25 corresponds to the knife-edge bearing 22. The bearing 23 rather than being formed as a knife-edge has a pivotal or substantially conical form, as clearly shown in Fig. 1. The seat 26 in the spring 24 is shaped to conform to this pivot. The spring 24 preferably will be formed of a suitable moisture resistant material, such as beryllium bronze.

The bearing pivot 23, as shown, is mounted upon the end of a screw 27 which is threaded in the adjacent end wall 11 of the casing. The screw 27 is provided with a slotted end 27a whereby the position of the screw and hence that of the pivot bearing 23 can be changed with an ordinary screw driver or similar instrument. The screw 27 is secured in its adjusted position by means of a lock nut 28. It will be observed in view of the foregoing construction that the position of the bearing 23 can be readily adjusted relatively to the bearing 22 on the bimetallic bar so as to change the tension in the spring member 24. The screw 27 and its lock nut 28 are formed of steel, rendered corrosion resistant by cadmium plating.

As pointed out in detail in the above-mentioned Simmons patent, the function of the U-shaped spring member 24 is to move the thermostat bar 13 quickly between its controlling positions. And further, that adjustment of the screw 15 changes the temperature setting of the device, while the range between the maximum and minimum temperatures at which the device operates is controlled by adjusting the position of the pivot 23 to vary the span of the U-shaped spring 24, that is, to vary its tension.

A substantially rigid and mechanically strong switch arm 30 is secured to the base of the U-shaped spring member 24, as shown in Fig. 1. The arm 30 is secured to the base of the spring so that it has pivotal motion relative to the base on a pair of axes arranged transversely of the base and also so that it has pivotal motion on an axis arranged longitudinally of the base. As shown, the switch arm 30 has depending therefrom a pair of lugs or ears 31 which are received in suitable apertures 31a (Fig. 2) of substantially the same length as the lugs and provided for them in the base of the spring so that they project through the spring member to the under side thereof. These lugs are provided on their under sides with locking abutments 32 which engage the underside of the spring to prevent withdrawal of the spring arm. However, the portions of the lugs between the switch arm and the abutments, as shown, have a sufficient length to provide for relative limited freedom of movement of the switch arm vertically relative to the base of the spring. The switch arm can be assembled with the spring by projecting the lugs with their locking portions 32 through elongated parts of the slots 31a provided in the spring and shown at the upper sides of the slots in Fig. 2, and then shifting the arm transversely to bring the locking abutments 32 of the lugs 31 under the abutments 34 provided in the spring.

The switch arm is biased toward the base of the spring by means of a compression spring 35 which is mounted upon a pin or shaft 36 that is passed through apertures provided for it in the switch arm and the base of the spring midway between its ends, as clearly shown in Fig. 1. The pin has heads 37 on its opposite ends, the upper of which bears on the upper surface of the arm 30, while the lower serves as an abutment for the lower end of the spring. The upper end of the spring, as shown, bears against the under side of the U-shaped spring member 24. Suitable knife-edge bearings 38 are provided on the upper surface of the switch arm arranged transversely of the arm on opposite sides of the aperture in the arm provided for the pin and on an axis passing substantially through the center of the pin so as to bear against the under surface of the adjacent head 37 of the pin.

The switch arm 30 is also provided with a pair of bearings 40 on the under side of the arm arranged to bear on the upper surface of the U-shaped spring member. These bearings also are arranged on opposite sides of the pin 35, and in this case are arranged on an axis arranged longitudinally of the switch arm passing substantially through the center of the pin.

The bearings 38 on the upper surface of the switch arm and the bearings 40 on its under surface are formed in any suitable manner, but preferably will be made by pressing them out from the material of the arm.

In view of the foregoing arrangement, it will be observed that the switch arm has pivotal movement on the base of the spring 24 about a pair of transverse axes which pass through the bearings 40. In other words, the arm can rock upon the base of the spring member on axes passing through both of these bearings.

The arm also can be pivoted or rotated on these bearings on an axis arranged longitudinally of the base of the spring.

The switch arm 30 carries on its free end a pair of bridging contacts 41 and 42 which are arranged to engage sets of fixed contacts 43 and 44 respectively arranged in pairs. The bridging contacts 41 and 42 are separated from the switch arm 30 by layers 45 and 46 respectively of a suitable electrically insulating material, such as mica. The two bridging contacts and the sheets of mica are secured to the switch arm by means of a rivet passed through all of these members, and preferably the end portions 42a of the lower bridging contact 42 will be turned upwardly over the ends of the mica strips so as to retain them in position, as shown in Fig. 1. The bridging and fixed contacts preferably will be formed of brass.

The fixed contacts 43 are rigidly secured to an insulating member 47, while the fixed contacts 44 are secured to an insulating member 48. The contacts 43 are secured to terminals 50, which in turn are secured to the insulating member 47 by means of rivets 51. These terminals are provided with suitable binding screws 52 with which electrical connections are made. Likewise, the fixed contacts 44 are secured to terminals 53 which are secured to the insulating member 48 by means of rivets 54. Suitable binding screws 55 are secured to the terminals 53. The terminals and binding screws preferably will be formed of brass.

The lower insulating member 48 rests upon the bosses 20 and the guides 18, which as previously pointed out, are provided in the side walls 12 at the sides of the thrust plate 17. The upper insulating member 47 rests upon suitable upright walls 44b provided on the side portions of the lower member 48. The two insulating members are secured together and to the base by means of screws 58 which pass through apertures provided for them in the insulating members and received in threaded engagement with the bosses 20. The screws 58 are rendered moisture resistant by means of cadmium plating. The lower insulating member 48 is provided with an upright cylindrical sleeve 59 (Fig. 2) extending from its upper surface and surrounding the adjusting rod or screw 15, while the upper member 47 is provided with a recess 47a that receives this cylindrical member.

The electrical connections are made with the binding posts 52 and 55 by directing the leads or conductors through an aperture 60 provided in one of the end walls 11, preferably, in the end wall adjacent the binding screws, as shown in Fig. 1. The aperture 60 is lined with an eyelet 60a which preferably will be formed of brass.

A suitable cover member 61 is secured to the casing by any suitable means, such as by means of screws 62 which are received in threaded engagement by bosses 63 arranged in the corner portions of the casing.

The cover member 61 is provided with an aperture 64 for receiving the cylindrical sleeve 59 of the lower insulating member, which as shown in Fig. 1, projects through the aperture for a relatively short distance. The upper end of the adjusting screw 15 projects from the sleeve and also, therefore, projects from the cover. The projecting portion of the screw is provided with a slot 65 for receiving an ordinary screw driver or similar instrument, whereby the adjustment of the rod 15 can be effected conveniently. Secured to the upper end of the adjusting screw 15 is an index or pointer 66 which cooperates with a suitable temperature scale (not shown) arranged on the upper surface of the cover 61 so as to assist in making the temperature settings. The insulating sleeve 59 is provided at its upper end with an arcuate wall 59a, the ends of which act as stops for the index pointer 66 at the lower and upper limits of its temperature setting so that it is impossible to move the adjusting screw beyond its normal range of operation, that is, beyond the upper and lower limits of the temperature range of operation of the device. This is important because it prevents the attendant from moving the adjustment beyond this normal range thereby obviating adjustments of the device which would destroy its calibration.

As shown, the cover 61 is lined with an electrically insulating sheet 67 which may be made of a suitable phenol condensation product.

The base member 10 is provided with a plurality of apertures 68 through which suitable screw fastening means (not shown) may be passed to secure the base in thermal relation with the body whose temperature is to be controlled. Thus, for example, the base may be secured to the side walls of a water heater storage tank, whereby the bimetallic bar 13 is caused to respond to the temperature of the water. It will be observed that the bottom wall of the casing is relatively thin so that when the casing is thus applied to the side walls of a tank or similar device, the temperature responsive bar 13 will be positioned quite close to the associated device.

In the operation of the temperature control device, it will be understood that the fixed contacts 43 and 44 will be electrically connected to the circuits to be controlled, or will be connected in suitable controlling circuits for the circuits to be controlled. In operation, the bridging contacts 41 and 42 are moved by the bimetallic bar 13 in acordance with temperature changes. In one specific application, the bimetallic bar 13 and the switch arm 30 are in their positions shown in Fig. 1 so as to close the contacts 44 as long as the temperature of the device whose temperature is being controlled is below the predetermined maximum temperature for which the device is set to operate by the adjusting screw 15. In the closed position of the thermostat, it will be observed that the bearing 40 at the left-hand end of the arm, as viewed in Fig. 1, bears upon the upper surface of the base of the U-shaped spring member 24, while the right-hand lug 31 limits the relative movement of the switch arm 30 away from the spring. It will also be observed that the compression spring 35 exerts a force on the spring member 24 and on the switch arm so as to bias these members together, that is, so as to tend to remove the clearance between the switch arm and the base of the spring at the right-hand side of the spring. The force of this spring 35, however, is overcome by the force of the U-spring 24 which forces the bimetallic bar 13 into the position shown in Fig. 1 when the temperature of the bar is below a predetermined value.

As the temperature of the device increases, the distortion of the thermostat bar 13 tends to move its free end upwardly against the force of the spring 24, and upon the occurrence of the predetermined maximum temperature for which the device is set, the thermostat bar 13 will overcome the force applied to it by the spring 24 and will move upwardly and rapidly accelerate to and through a neutral position to the opposite side thereof, whereby the bridging contact 42 opens the fixed contacts 44 and the bridging contact 41 closes the fixed contacts 43. The contacts 44 are quickly opened by the snap action of the thermostat, while the contacts 43 will be quickly closed. The snap action is enhanced by the flexible connection between the switch arm 30 and the spring 24. Thus, it will be observed that the initial relatively slow movement of the thermostat bar will be absorbed by the limited space between the switch arm 30 and the right-hand side of the base of the U-shaped spring 24, and that the bar 13 will be given opportunity to accelerate to a relatively high speed before the switch arm is engaged by the spring 24 to open the contacts 42 and to close the contacts 43.

The spring 24 will hold the switch contacts 43 closed until the temperature of the device is lowered to a predetermined minimum, whereupon the bar 13 will quickly move the switch arm 30 to break the contacts 43 and to make the contacts 44. When the contacts 43 are closed by the bridge 41 the right-hand bearing 40 of the switch arm 30 will bear upon the right-hand side of the U-shaped spring member 24, while the left-hand bearing will be removed from the adjacent side of the U-shaped spring member 24 to provide a clearance space between these ends of the switch arm and the base of the spring similar to the clearance between the right sides of these members shown in Fig. 1. This clearance will be limited by the left hand lug 31, and, as before, will permit the bar 13 to gain considerable velocity before the spring 24 engages the switch arm 30 to open the contacts 43 and to close the contacts 42.

In other words, when the bimetallic bar 13 is operated between its controlling positions, the switch arm 30 will be rotated on transverse axes passing through the bearings 40, the particular axis depending upon whether the bimetallic bar 13 is moving upwardly or downwardly, as viewed in Fig. 1; when it moves upwardly, the switch bar 30 rotates on the left-hand bearing 40, whereas when the bar 13 moves downwardly, it rotates on the right-hand bearing 40, and in each case, by reason of this rotation, the bimetallic bar is given an opportunity to acquire considerable velocity before the control arm 30 is actuated. In view of the fact that the pin 36 is located centrally of the spring 24, there is an equal amount of rocking of the arm 30 on both sides of the neutral position.

It will also be observed that the switch arm 30 can rotate on these bearings on the longitudinal axis passing substantially through the center of the spring member 24, whereby the bar can accommodate itself to irregularities or inaccuracies of the contacts.

The loose connection between the switch arm 30 and the spring 24 has the further advantage that the switch contacts are caused to move into and out of engagement with a wiping action thereby preventing the accumulation of dirt or other deposits on either the movable or the stationary contacts. For example, when the bimetal bar 13 is moving upwardly, as viewed in Fig. 1, the U-spring 24 rotates in an upward direction about the pivot 25. This action of the spring 24 moves the switch arm 30 toward the left until the clearance between the spring and the switch arm at the right side has been absorbed when the spring will engage the arm to move it upwardly. This shifting of the switch arm toward the left by the initial movement of the bimetal bar draws or wipes the bridging contact 42 across the fixed contacts 44. Similarly, when the bimetal bar moves downwardly, the bridging contact 41 is caused to wipe the fixed contacts 43. In either case, when the switch arm is rotating on the proper bearing 40, it rotates at the same time with reference to the upper pin head 37 on the bearings 38.

As pointed out previously, the temperature setting of the control device is adjusted by means of the rod 15, whereas the range between the maximum temperature at which the bimetallic thermostatic bar 13 moves to open the contacts 44 and to close the contacts 43 and the minimum temperature at which it is moved to open the contacts 43 and close the contacts 44 is effected by changing the position of the fixed bearing 23.

In the modified form of this invention shown in Fig. 3, only one set of fixed contacts is provided. As shown in this figure, one set of fixed contacts 70 is mounted upon an insulating supporting body 71 which in turn is supported in a casing 72, similar to the casing 10, 11, 12 of Figs. 1 and 2. Cooperating with these contacts is a bridging contact 73 which is carried by a control arm 74. This arm is mounted on the base of a U-shaped spring 75 which, as shown, bears on the free end of a bimetallic thermostat bar 76. The arm 74, the spring 75 and the bar 76 all are arranged in substantially the same fashion as are the corresponding parts shown in Figs. 1 and 2, except that the bar 74 does not carry the second upper bridging contact, because the upper set of fixed contacts have not been used, and the control device in Fig. 3 operates in substantially the same manner as does the control device of Figs. 1 and 2. In Fig. 3, however, a suitable adjustable stop member 77 is arranged to engage the U-spring 75 when the thermostat bar 76 has operated the switch contact 73 to its open position, as shown in dotted lines in Fig. 3. This stop 77, as shown, is in the form of a screw which is threaded in the end wall of the casing adjacent the spring 75. The stop 77 is held in its adjusted position by means of a lock nut 78.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A temperature control device comprising an element arranged to change its position in response to changes in temperature, an elastic member operably associated with said element arranged to cause it to change its position quickly, a control member and connection means between said control member and said elastic member providing for movement of said control member with reference to said elastic member on each of a plurality of substantially parallel axes arranged in a preselected direction, and also on a third axis substantially perpendicular to said parallel axis, said connection means preventing substantial relative movement of said control member to said elastic member on axes arranged in any other than said three axes.

2. A temperature control device comprising a bimetallic thermostat bar arranged to move between a pair of controlling positions responsively to changes in temperature, a substantially U-shaped spring bearing on said bar so as to cause it to move quickly between said controlling positions, and a substantially rigid control arm mounted lengthwise on the base of said U-shaped spring movable by said spring between a pair of fixed members, bearings on said switch arm spaced longitudinally thereof so as to rest on the end portions of said base, said arm pivoting on said bearings to move in opposite directions away from said base on a pair of substantially parallel transverse axes when said arm engages said fixed members respectively, and said bearings providing for pivotal movement of said control arm on an axis extending through both of said bearings longitudinally of said base at substantially right angles to said pair of parallel axes, and resilient means between said arm and said base biasing said arm toward said base.

3. A temperature control device comprising a bimetallic thermostat bar arranged to move between a pair of controlling positions responsively to changes in temperature, a substantially U-shaped spring bearing on said bar so as to move said bar quickly between said controlling positions, the base of said spring moving in the plane of movement of said bar, a substantially rigid switch arm mounted lengthwise on the base of said U-shaped spring member so as to move in the plane of movement of said thermostat bar between a pair of controlling positions, switch contacts engaged by said switch arm in each of said positions, knife-edge bearings on said switch arm spaced longitudinally thereof so as to rest on the end portions of said base, a pair of lugs on said arm spaced longitudinally thereof between said spaced bearings, said lugs projecting through a pair of spaced apertures provided for them in said base, retaining means preventing the withdrawal of said lugs from said base, but providing for limited relative movement of said arm and said base, a pin passing through apertures provided for it in said arm and base substantially midway between the bearings on said arm, heads on the opposite ends of said pin, a compression spring interposed between the under side of said base and the head of the pin on that side and a pair of knife-edge bearings on the outer side of said switch arm on opposite sides of said pin bearing against the other head on said pin.

4. A temperature control device comprising a bimetallic thermostat bar arranged to move between a pair of controlling positions responsively to changes in temperature, a substantially U-shaped spring bearing on said bar so as to move said bar quickly between said controlling positions, the base of said spring moving in the plane of movement of said bar, a substantially rigid switch arm mounted lengthwise on the base of said U-shaped spring member so as to move in the plane of movement of said thermostat bar between a pair of controlling positions, knife-edge bearings on said switch arm spaced longitudinally thereof so as to rest on the end portions of said base, connection means between said switch arm and said base providing for limited movement of said arm on said bearings relative to said base, a pin passing through apertures provided for it in said arm and base substantially mid-way between the bearings on said arm, heads on the opposite ends of said pin, a spring interposed between the under side of said base and the head of the pin on that side and a pair of knife-edge bearings on the outer side of said switch arm on opposite sides of said pin bearing against the other head on said pin.

WALLACE J. ETTINGER.